US012617369B2

(12) United States Patent
Tonosaki

(10) Patent No.: US 12,617,369 B2
(45) Date of Patent: May 5, 2026

(54) CENTER PILLAR UPPER

(71) Applicant: KASAI KOGYO CO., LTD.,
Kanagawa (JP)

(72) Inventor: Akira Tonosaki, Utsunomiya (JP)

(73) Assignee: KASAI KOGYO CO., LTD.,
Kanagawa (JP)

( * ) Notice: Subject to any disclaimer, the term of this
patent is extended or adjusted under 35
U.S.C. 154(b) by 0 days.

(21) Appl. No.: 18/993,563

(22) PCT Filed: Aug. 8, 2022

(86) PCT No.: PCT/JP2022/030258
§ 371 (c)(1),
(2) Date: Jan. 12, 2025

(87) PCT Pub. No.: WO2024/033964
PCT Pub. Date: Feb. 15, 2024

(65) Prior Publication Data
US 2026/0027990 A1 Jan. 29, 2026

(51) Int. Cl.
B60R 13/02 (2006.01)
B60R 22/20 (2006.01)
B60R 22/24 (2006.01)
(52) U.S. Cl.
CPC ............ B60R 22/24 (2013.01); B60R 13/025
(2013.01); B60R 22/201 (2013.01)
(58) Field of Classification Search
CPC ...... B60R 13/025; B60R 22/201; B60R 22/24
USPC ....................................................... 280/801.1
See application file for complete search history.

(56) References Cited

U.S. PATENT DOCUMENTS 12,103,437 B2 * 10/2024 Kuroda ................ B60N 2/0715

FOREIGN PATENT DOCUMENTS

| CN | 103874608 A | * | 6/2014 | ............. B60R 22/03 |
| CN | 215621865 U | | 1/2022 | |
| FR | 2626826 A2 | * | 8/1989 | ........... B60R 22/201 |
| FR | 3137357 A1 | * | 1/2024 | ........... B60R 22/201 |
| JP | H02-045865 U | | 3/1990 | |

(Continued)

OTHER PUBLICATIONS

Description Translation for JP 2019/116228 from Espacenet (Year: 2019).*

(Continued)

*Primary Examiner* — Jason D Shanske
*Assistant Examiner* — Daniel M. Keck
(74) *Attorney, Agent, or Firm* — United IP Counselors,
LLC

(57) ABSTRACT

A center pillar's upper part trim includes a slider and a knob.
The slider has a boss projecting in the back side direction.
The knob has a flexible member extending in a cantilever
manner in a first direction being one operation direction and
other end opposed to the flexible member on the first
direction side of the flexible member. The center pillar's
upper part trim further includes: a slide-and-join structure
allowing the knob to slide and join to a plurality of engaging
catches from a state where the flexible member of the knob
is placed on the boss; and a restriction structure restricting
the knob, in a state where the knob has slid and joined, from
excessively shifting in the first direction and the second
direction by setting the boss between the flexible member
and the other end when the knob is operated to slide.

4 Claims, 8 Drawing Sheets

(56)  References Cited

FOREIGN PATENT DOCUMENTS

| JP | H04-083954 U | 7/1992 |
| JP | 2019-116228 A | 7/2019 |
| JP | 2022-032457 A | 2/2022 |
| KR | 200194581 Y1 * | 9/2000 |

OTHER PUBLICATIONS

International Search Report for International Application No. PCT/JP2022/030258 dated Oct. 4, 2022, Japan, 2 pages.
Written Opinion for International Application No. PCT/JP2022/030258 dated Oct. 4, 2022, Japan, 3 pages.

* cited by examiner

UP — LONGITUDINAL DIRECTION

DOWN — SHORT-SIDE DIRECTION

UP

LONGITUDINAL
DIRECTION

DOWN SHORT-SIDE
DIRECTION

UP    LONGITUDINAL
      DIRECTION

DOWN  SHORT-SIDE
      DIRECTION

CENTER PILLAR UPPER

CROSS-REFERENCE TO RELATED APPLICATIONS

This application is a National Stage Entry application of PCT International Application No. PCT/JP2022/030258, filed on Aug. 8, 2022, the entire contents of which are hereby incorporated by reference.

BACKGROUND

1. Technical Field

The present invention relates to a center pillar's upper part trim.

2. Description of the Background

Conventionally, center pillar's upper part trims that cover vehicles' center pillars are known. A center pillar's upper part trim schematically consists of a base member, a slider mounted on the back side of the base member, and a knob joined to the back side of the slider. A seat belt anchor is disposed on the back side of the base member. The slider is mounted also on the seat belt anchor. With the seat belt anchor, the slider is slidable relative to the base member to adjust the vertical position of the seat belt anchor. The knob corresponds to an operation part joined to the slider. An operation on the knob allows an adjustor to adjust the vertical position of the seat belt anchor and the slider (e.g., see JP 2019-116228 A).

BRIEF SUMMARY

In such a center pillar's upper part trim, the slider has an anchoring catch (hereinafter referred to as the engaging catch) that projects perpendicularly to the slider's surface. By the knob being pushed in along the surface of the slider against the slider's engaging catch, the knob climbs over the catch to be joined to the slider. The slider has a restriction member for restricting the knob's movement amount on each of one (e.g., the upper) and the other (e.g., the lower) directions in the knob operation directions. Thus, the knob's excessive shifting is restricted by one or the other end in the operation directions being brought into contact with the restriction member.

Here, in joining the knob to the slider, the knob must be pushed in while flexing the engaging catch. However, the height of the engaging catch is just enough to prevent the knob from wobbling. Thus, pushing in the knob while flexing the low-height engaging catch incurs a great load, and the flexing can cause the engaging catch to blanch. Furthermore, requiring restriction members on one and other sides in the knob's operation directions to restrict the knob's sliding movement increases the resin amount and weight of the restriction members and complicates other members' layouts.

The present invention has been made in view of the foregoing, and an object thereof is to provide a center pillar's upper part trim that can dispense with a restriction member on a slider in the operation direction relative to a knob, requires less force in joining the knob, and suppresses blanching.

In order to solve the problem, a center pillar's upper part trim of the present invention provides a center pillar's upper part trim covering a vehicular center pillar, including: a base member mounted on a center pillar and having an opening; a slider mounted on the opening from a back side of the base member to be slidable with a seat belt anchor; and a knob joined from a back side of the slider by a plurality of engaging catches to be slidably operated, the knob being partially exposed on a front side as an operation part. The slider has a boss projecting in a back side direction. The knob has a flexible member extending in a cantilever manner in a first direction being one operation direction of the knob and an opposed wall opposed to the flexible member on the first direction side of the flexible member. The center pillar's upper part trim further includes a slide-and-join structure allowing, in joining the knob to the slider, the knob to fit in space between the back side of the slider and the plurality of engaging catches by causing the knob having the flexible member placed on the bosses to slide by a predetermined distance in a second direction opposite to the first direction, and a restriction structure restricting the knob, in a state where the knob has joined to the slider fitting in the space as a result of the sliding by a predetermined distance, from excessively shifting in the first direction and the second direction by the flexible member leaving the position on the boss to set the boss between the flexible member and the opposed wall, and by the boss being brought into contact with the flexible member or the opposed wall when the knob is operated.

The present invention provides a center pillar's upper part trim that can dispense with a restriction member on a slider in the operation direction relative to a knob, requires less force in joining the knob, and suppresses blanching.

DETAILED DESCRIPTION

In the following, the present invention will be described based on a preferred embodiment. Note that, the present invention is not limited to the following embodiment and can be changed as appropriate within the range not departing from the gist of the present invention. While some elements in the embodiment may not be illustrated or described, it goes without saying that those omitted technical details appropriately employ publicly known or well-known techniques within the scope that does not contradict the contents described below.

Figure 1:
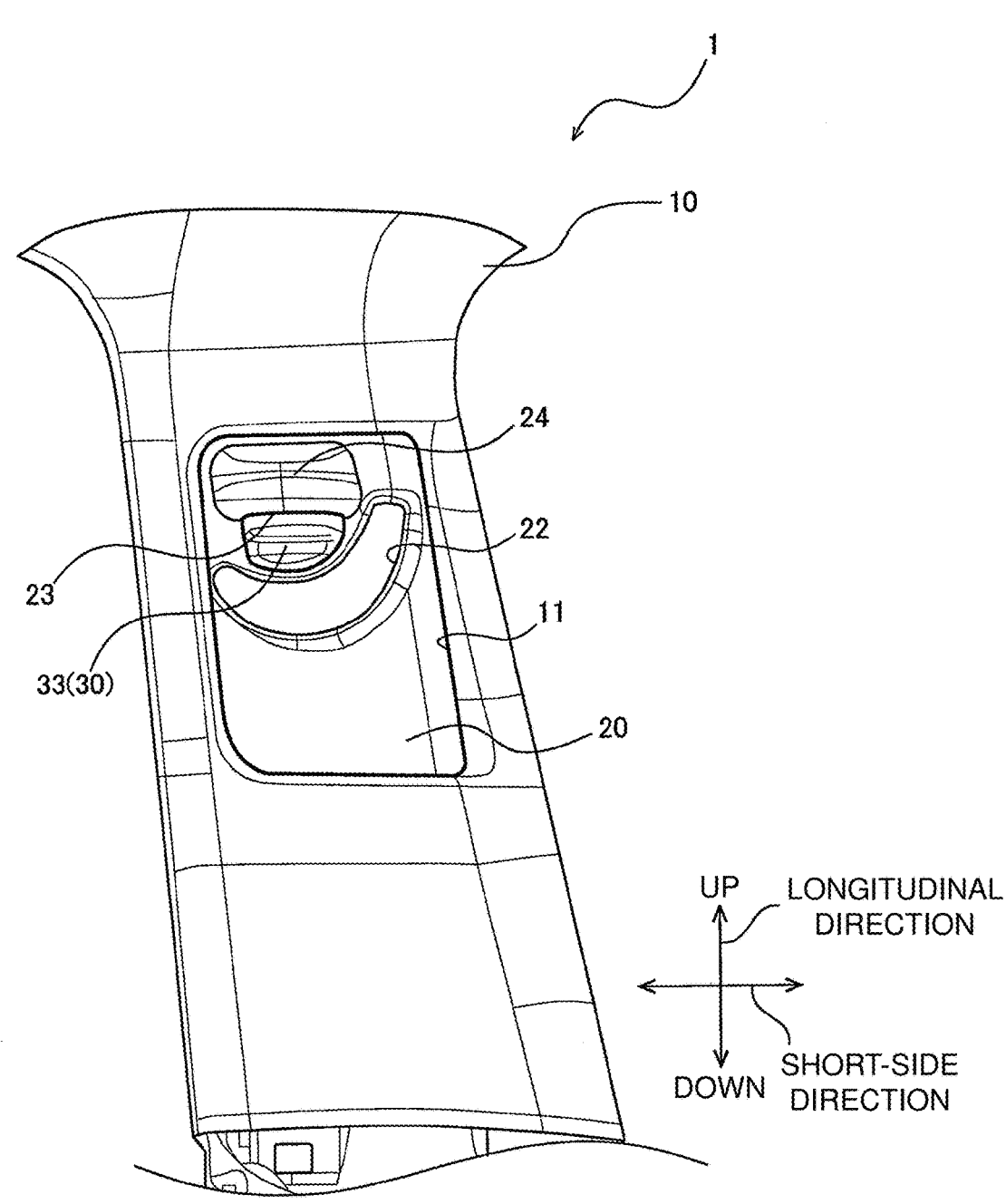
FIG. 1 is a front view of a center pillar's upper part trim according to a present embodiment.
Figure 2:
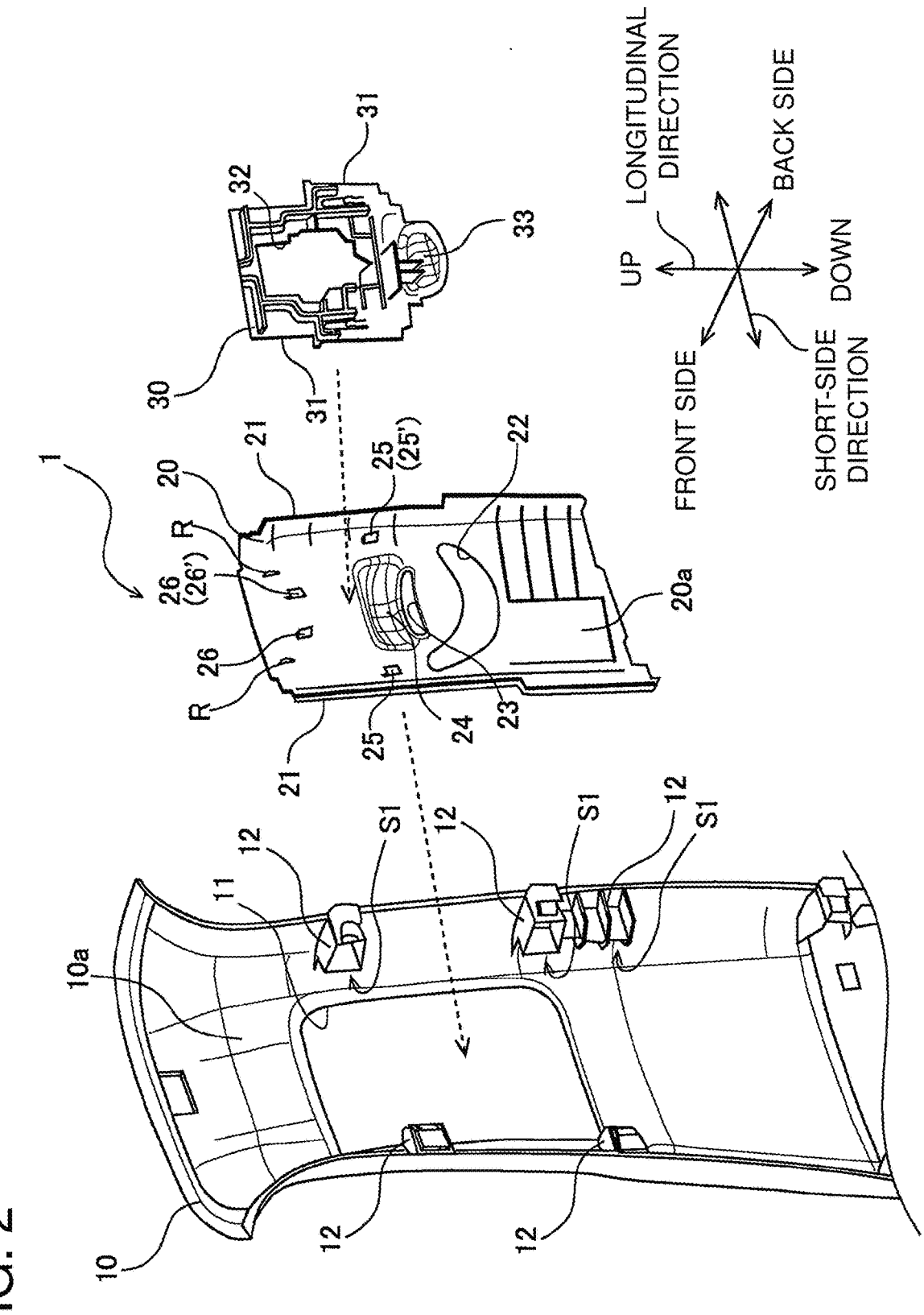
FIG. 2 is an exploded back side view of the center pillar's upper part trim in FIG. 1.

FIG. 1 is a front view of a center pillar's upper part trim according to the present embodiment. FIG. 2 is an exploded back side view of the center pillar's upper part trim in FIG. 1. The center pillar's upper part trim 1 according to the present embodiment is an interior member that covers the upper part of the vehicular center pillar inside the cabin. As shown in FIGS. 1 and 2, the center pillar's upper part trim 1 includes a base member 10, a slider 20, and a knob 30.

The base member 10 is a member fixed to the center pillar. As shown in FIG. 2, the base member 10 has its both ends in the short-side direction bent toward the back side (outward from the cabin), whereby the cross section along the short side is approximately U-shaped. The base member 10 houses, in its U-shaped inner portion, a seat belt anchor (not shown) that has an adjuster function on the center pillar side. The base member 10 has an opening 11. The slider 20 is mounted on the base member 10 from the back side of the opening 11.

As shown in FIG. 2, the base member 10 further includes a plurality of guide members 12 on the back side of both ends in the short side direction. The plurality of guide members 12 have a predetermined gap S1 between themselves and a back surface 10a of the base member 10. The gap S1 is continuous in the longitudinal direction of the base member 10.

The slider 20 is a member slidable with the seat belt anchor relative to the longitudinal direction of the base member 10. Having its both ends 21 in the short-side direction fitted in the gap S1, the slider 20 is mounted on the base member 10 to be slidable in the longitudinal direction. The slider 20 is mounted on the seat belt anchor to slide with the seat belt anchor when sliding relative to the base member 10. The slider 20 further includes a first through hole 22 for allowing a seat belt (not shown) from the seat belt anchor to pass.

The slider 20 further includes a second through hole 23 at a higher level than the first through hole 22. The slider 20 includes a bulge 24 that bulges from the back side toward the front side. The second through hole 23 penetrates through the bulge 24 downwardly.

Figure 3A:
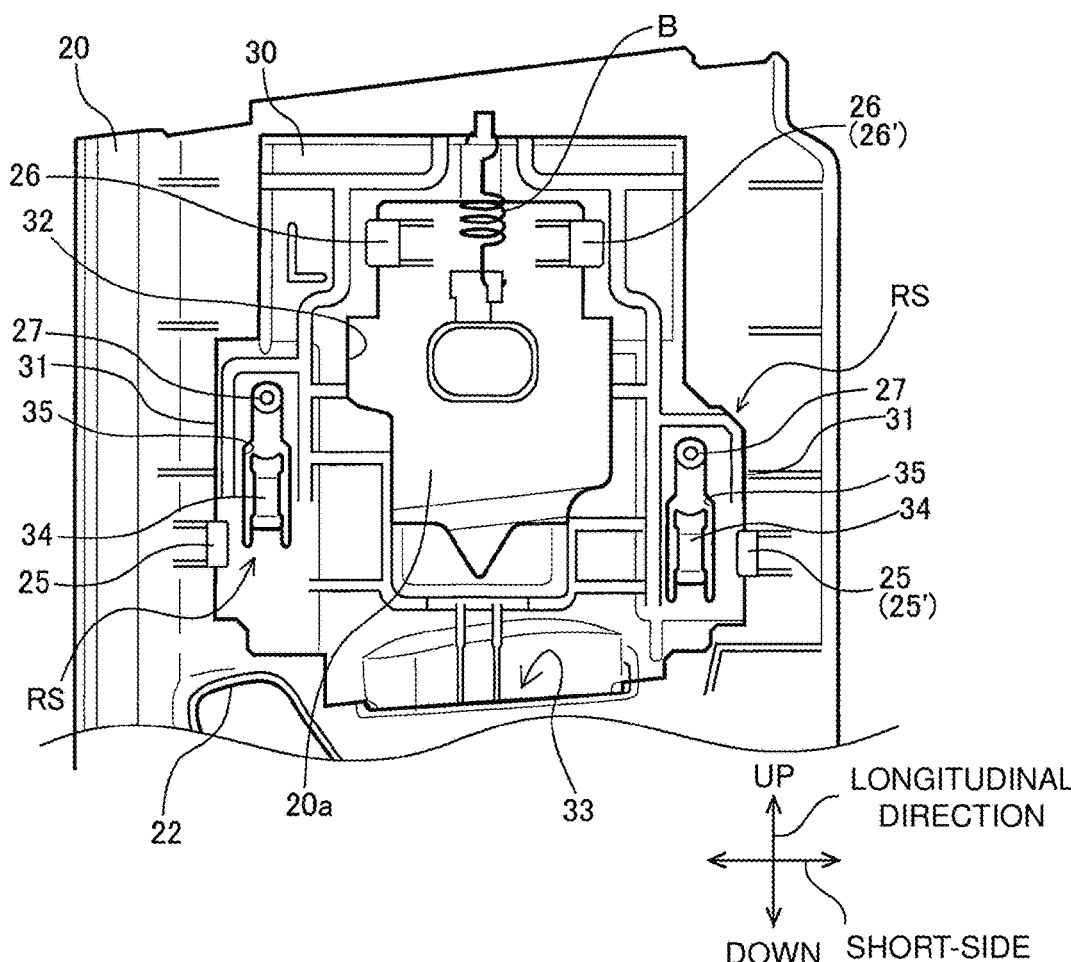
FIG. 3A is a back side plan view of the joined knob and slider.
Figure 4A:
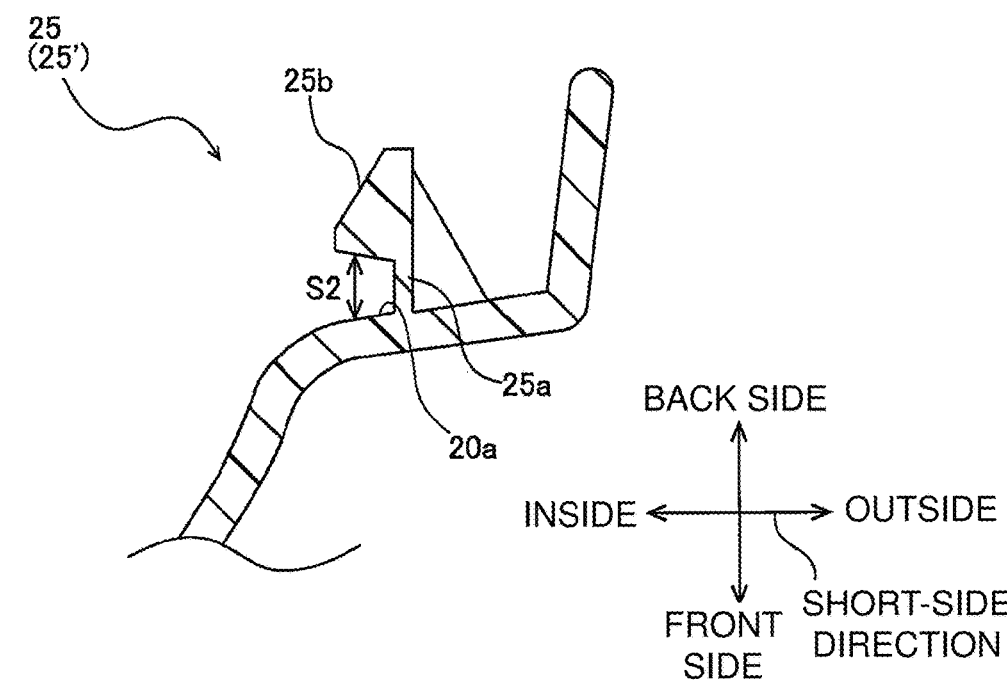
FIG. 4A is a sectional view of a first engaging catch, one of the two first engaging catches in FIG. 3A.
Figure 4B:
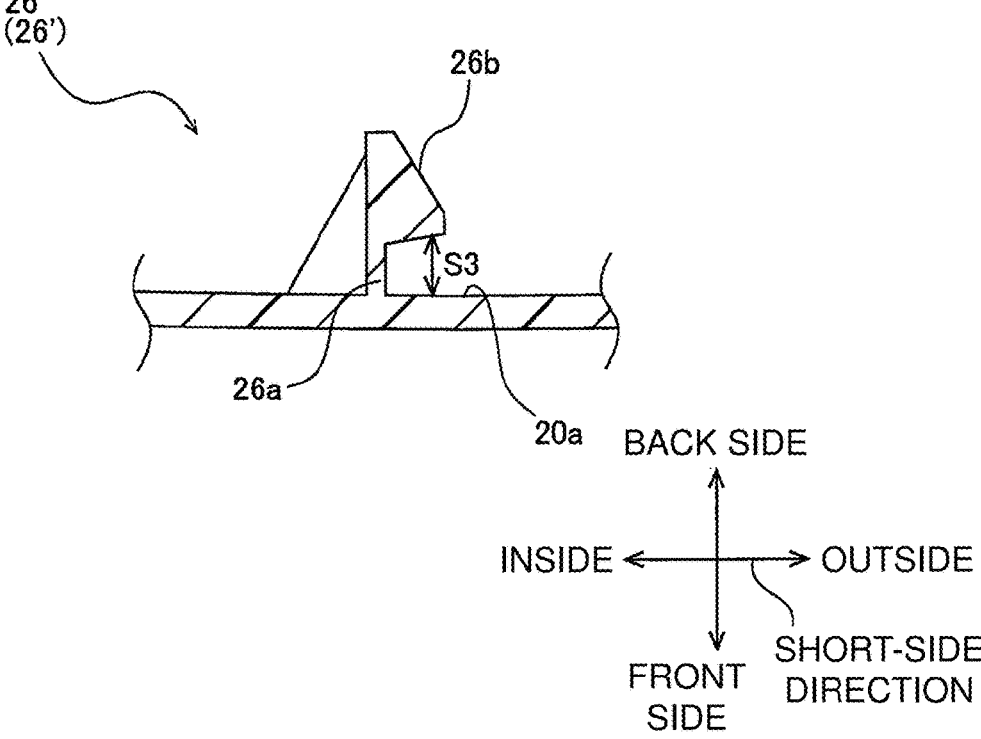
FIG. 4B is a sectional view of a second engaging catch, one of the two second engaging catches in FIG. 3A.

The knob 30 is a member joined to the slider 20 to be slidably operated. FIG. 3A is a back side plan view of the joined knob 30 and slider 20. As shown in FIG. 3A, the slider 20 includes a plurality of engaging catches 25, 26 extending on the back side to be joined with the knob 30. FIGS. 4A and 4B are each a sectional view of engaging catches 25, 26 in FIG. 3A. FIG. 4A is a sectional view of a first engaging catch 25', one of two first engaging catches 25.

As shown in FIG. 4A, the one first engaging catch 25' includes a basal part 25a that projects toward the back side and a lateral part 25b that extends from the tip side of the basal part 25a in the short-side direction (toward the inner side of the knob 30). The other first engaging catch 25 is substantially symmetric to the one first engaging catch 25' with reference to the vertical direction. By both ends 31 of the knob 30 (see FIGS. 2 and 3A) entering gaps (space) S2 between the lateral parts 25b of the plurality of first engaging catches 25 and a back surface 20a of the slider 20, the knob 30 is joined to the slider 20 to be slidably operated.

FIG. 4B is a sectional view of a second engaging catch 26', one of two second engaging catches 26. Similarly to the first engaging catch 25, the one second engaging catch 26' includes a basal part 26a that projects toward the back side and a lateral part 26b that extends from the tip side of the basal part 26a in the short-side direction (toward the outer side of the knob 30). The other second engaging catch 26 is substantially symmetric to the one second engaging catch 26' with reference to the vertical direction. The knob 30 has an opening 32 at its upper center (see FIGS. 2 and 3A). The plurality of second engaging catches 26 are positioned corresponding to the inside of the opening 32. By the opening 32 of the knob 30 entering gaps (space) S3 between the lateral parts 26b and the back surface 20a of the slider 20, the knob 30 is joined to the slider 20 to be slidably operated.

In this manner, the first engaging catches 25 externally slidably hold the knob 30, and the second engaging catches 26 internally slidably hold the knob 30, inside the opening 32 of the knob 30.

As shown in FIG. 2, the knob 30 includes a protrusion 33 that protrudes toward the front side at its bottom. When the knob 30 is slidably joined to the slider 20, as shown in FIG. 1, the protrusion 33 becomes exposed on the front side at the second through hole 23 to function as an operation part operated by the user.

Figure 5A:
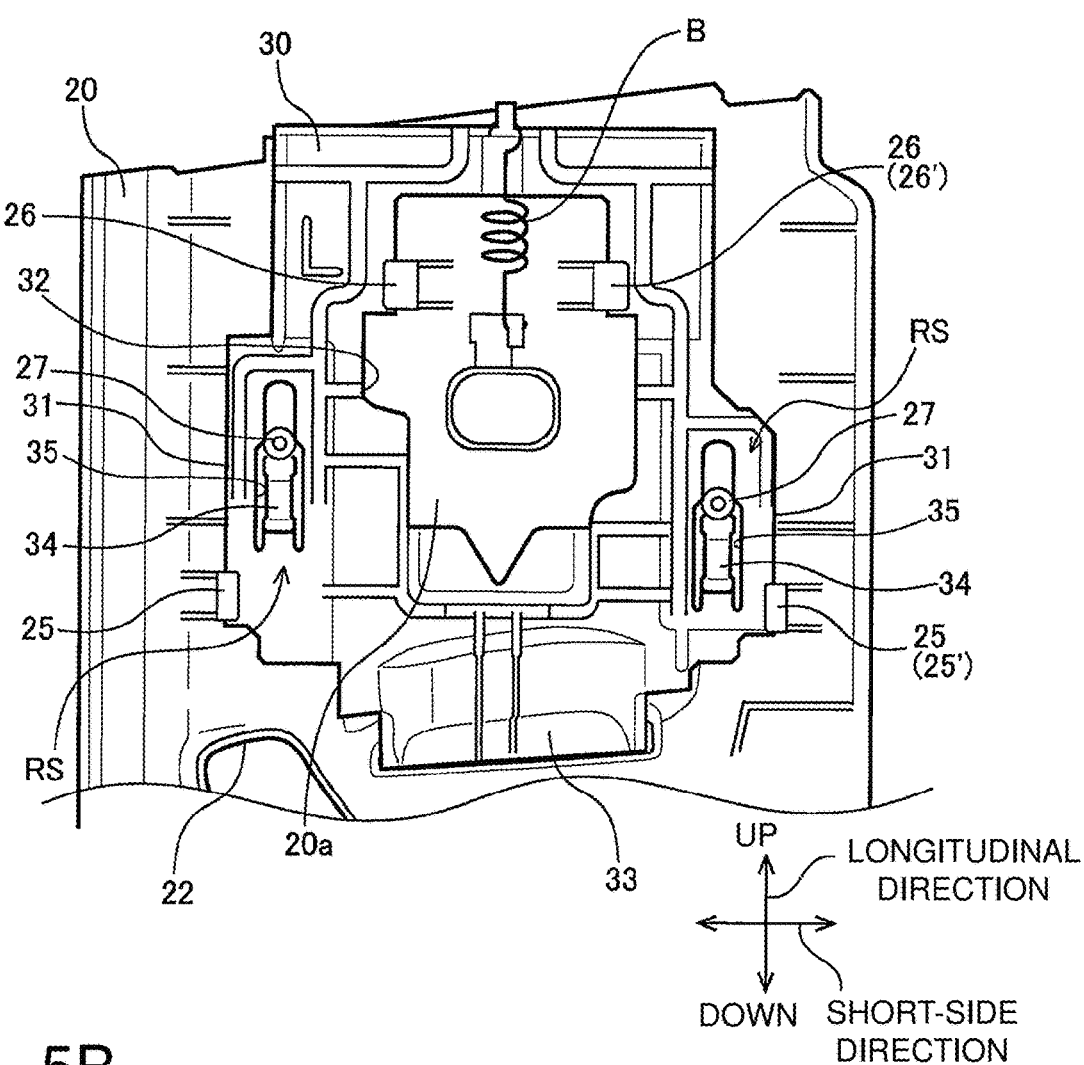
FIG. 5A is a back side plan view of the joined knob and slider when the knob is operated.

FIG. 5A is a back side plan view of the joined knob 30 and slider 20 when the knob 30 is operated. As shown in FIGS. 3A and 5A, a spring member B is suspended across the slider 20 and the knob 30. In the initial state (unoperated mode: the state in FIGS. 1, 3A and 3B), the protrusion 33 is exposed on the front side through the second through hole 23; in the user-operated mode (the state in FIGS. 5A and 5B), the protrusion 33 is pushed upward to be partially hidden on the front side. When the protrusion 33 is pushed upward, the spring member B extends; when the unoperated mode is entered by the user removing their hand from the protrusion 33, the spring member B is compressed and the protrusion 33 returns to the initial state.

Furthermore, in the center pillar's upper part trim 1 according to the present embodiment, an operation on the knob 30 (to push the protrusion 33 upward) activates the adjuster function of the seat belt anchor, allowing the slider 20 to slide with the seat belt anchor in the longitudinal direction of the base member 10. Thus, the first through hole 22 of the slider 20 also vertically shifts, vertically adjusting the seat belt outlet.

Furthermore, in the present embodiment, as shown in FIGS. 3A and 3B and 5A and 5B, the slider 20 includes a plurality of cylindrical bosses 27 that project toward the back side. Furthermore, the knob 30 includes flexible members 34 and slits 35. In the center pillar's upper part trim 1 according to the present embodiment, the knob 30 includes a plurality of combinations (two sets) of flexible members 34 and slits 35. The sliders 20 have the bosses 27 as many as the number of sets. Each boss 27 has a diameter slightly smaller than that of a narrow part 35b, which will be described later. When the knob 30 is joined to the slider 20, each boss 27 is positioned inside corresponding slit 35 (between a tip 34a and other end 35d, which will be described later).

Figure 6:
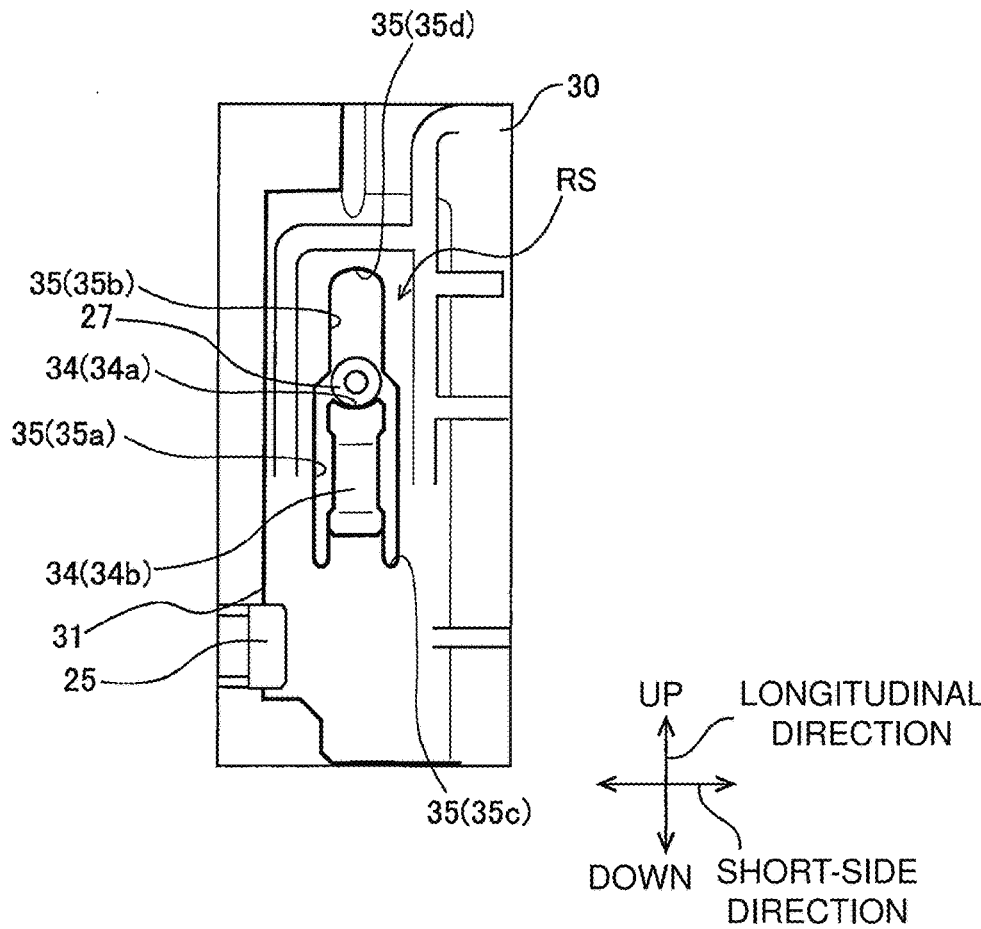
FIG. 6 is a partial enlarged view corresponding to FIG. 5A.

FIG. 6 is a partial enlarged view corresponding to FIG. 5A. As shown in FIG. 6, the knob 30 includes the slits 35 extending in the longitudinal direction of the base member 10 (see FIG. 1). Each slit 35 has a wide part 35a with a larger width and a narrow part (sidewall) 35b formed above the wide part 35a with a smaller width than the wide part 35a. The flexible member 34 extends in a cantilever manner in a first direction (the upper direction in the longitudinal direction in FIG. 6) being one operation directions of the knob 30. The flexible member 34 is positioned in the wide part 35a, with its tip 34*a* reaching near the narrow part 35*b*. The tip 34*a* of the flexible member 34 has an arc shape conforming to the cylindrical boss 27. The slit 35 further includes one end 35*c* as the lower end and other end (opposed wall) 35*d* as the upper end. The other end 35*d* is positioned toward the first direction than the flexible member 34.

Figure 3B:
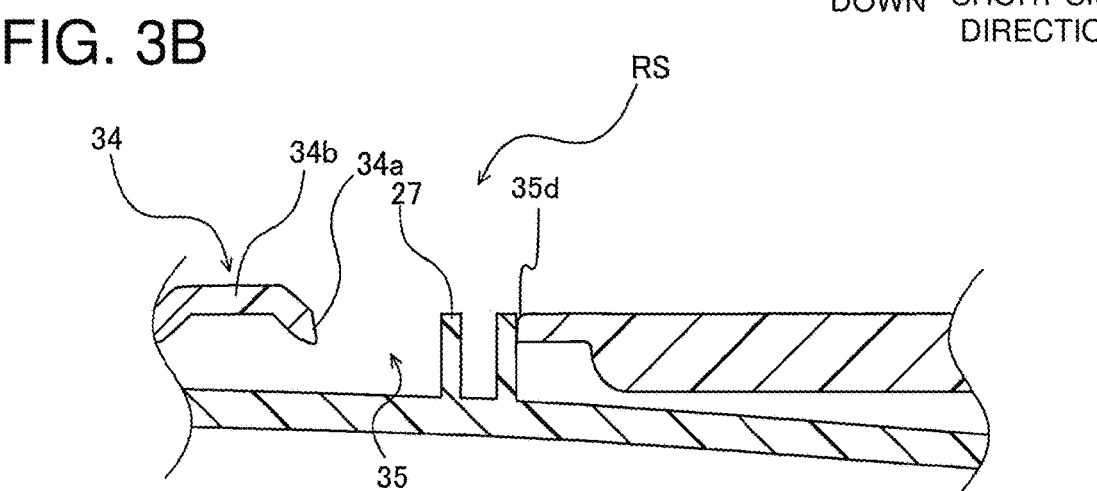
FIG. 3B is a partial enlarged sectional view of the joined knob and slider when the knob is not operated.
Figure 5B:
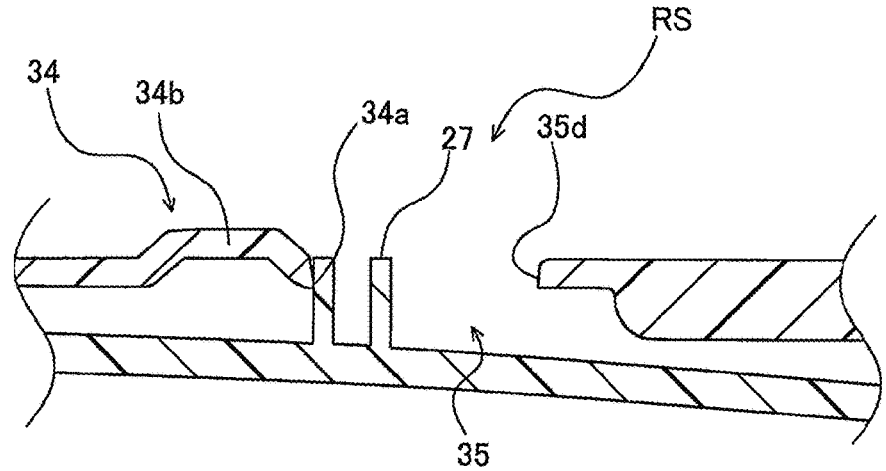
FIG. 5B is a partial enlarged sectional view of the joined knob and slider when the knob is operated.

In the center pillar's upper part trim 1 according to the present embodiment, when the knob 30 is operated, each boss 27 shifts in corresponding slit 35. FIG. 3B is a partial enlarged sectional view of the knob 30 in an unoperated mode. FIG. 5B is a partial enlarged sectional view of the knob 30 in an operated mode.

The center pillar's upper part trim 1 according to the present embodiment can dispense with a restriction member that restricts the upward or downward shifting of the knob 30 by virtue of having a restriction structure RS described below. The restriction structure RS is structured by the bosses 27, the flexible members 34, and the slits 35 and others described above.

First, in the unoperated mode (initial state) of the knob 30, the knob 30 is pulled downward by the spring member B. As a result, as shown in FIG. 3B, each boss 27 is in contact with the other end 35*d* of corresponding slit 35; and as shown in FIG. 1, the protrusion 33 of the knob 30 is exposed on the front side. In such a state, the bosses 27 being in contact with the other ends 35*d* are restricted from further excessively shifting (i.e., excessively shifting in the second direction opposite to the first direction (i.e., the downward direction in the longitudinal direction in FIG. 3A)).

On the other hand, when the user pushes in the protrusion 33 of the knob 30 upward, as shown in FIG. 5A, the knob 30 slides upward as a whole and the spring member B extends. Here, as shown in FIG. 5B, each boss 27 is in contact with the tip 34*a* of corresponding flexible member 34. In this state, the bosses 27 being in contact with the tips 34*a* of the flexible members 34 are restricted from further excessively shifting (i.e., excessively shifting in the first direction).

In this manner, each boss 27 is positioned between the other end 35*d* of corresponding flexible member 34 and corresponding slit 35. The sliding amount of the knob 30 is restricted to be approximately as long as the length of the narrow part 35*b* by the restriction structure RS. Hence, the slider 20 according to the present embodiment can dispense with a restriction member that restricts the upward or downward shifting of the knob 30.

Furthermore, as shown in FIGS. 3B and 5B, each flexible member 34 includes a convex 34*b* near the tip side. The convex 34*b* is convex in the projecting direction of corresponding boss 27.

Furthermore, using the slide-and-join structure SS explained below, the center pillar's upper part trim 1 according to the present embodiment requires less force in joining the knob 30 and suppresses blanching of the engaging catches 25, 26. The slide-and-join structure SS consists of the engaging catches 25, 26, the bosses 27, and the flexible members 34 and others described above.

Next, a description will be given of the slide-and-join structure SS of the center pillar's upper part trim 1 according to the present embodiment and a method of joining the knob 30 to the slider 20.

Conventionally, the knob 30 is joined to the slider 20 by pressing the knob 30 against the plurality of engaging catches 25, 26 (see FIG. 2 and others) formed at the slider 20 in the plane direction (the extending direction of the basal parts 25*a*, 26*a* of the engaging catches 25, 26) while flexing the engaging catches 25, 26. In the present embodiment, the slide-and-join structure SS allows the knob 30 to slide to be joined to the slider 20.

Figure 7A:
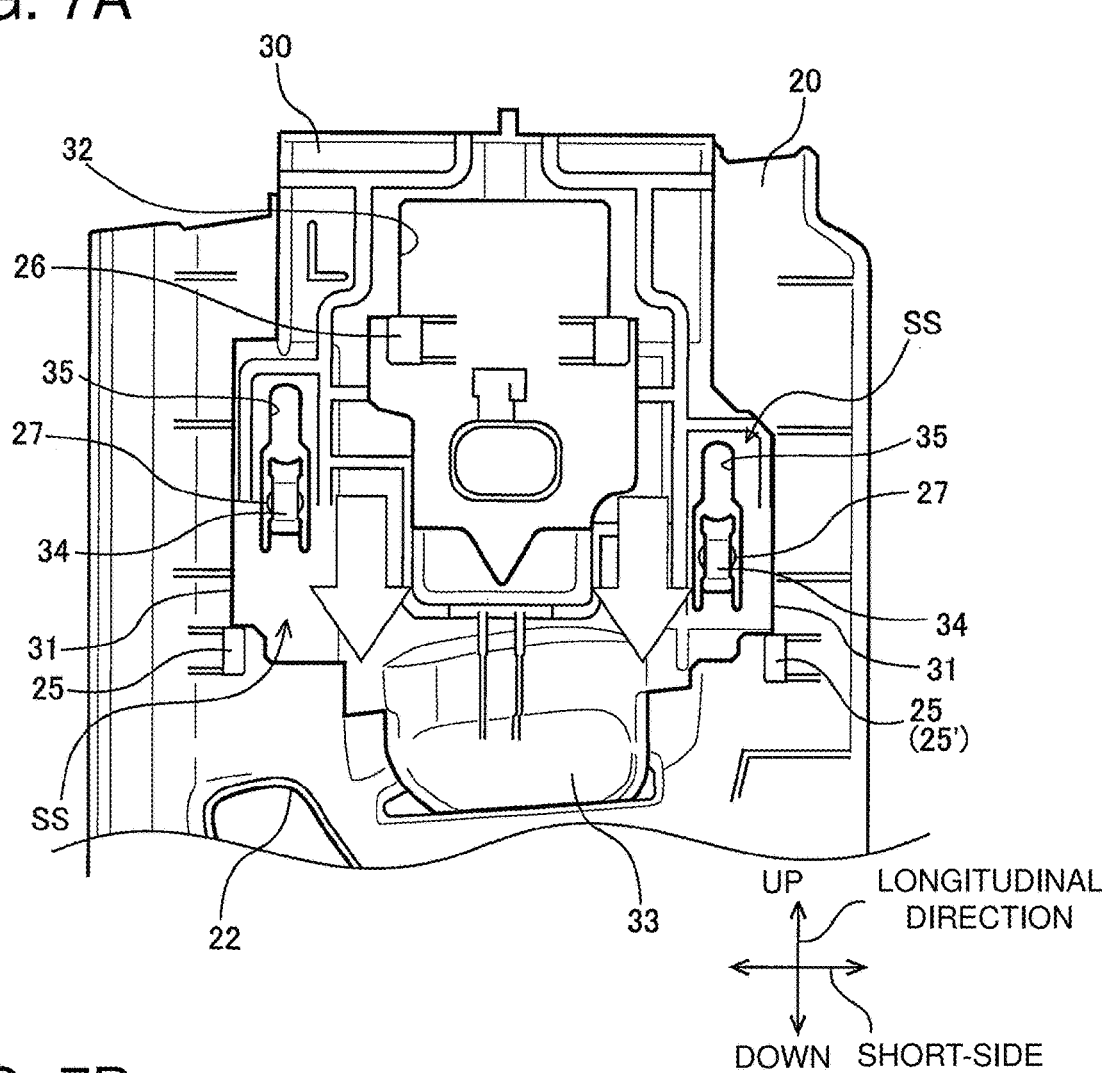
FIG. 7A is a plan view of the knob according to the present embodiment being joined to the slider.
Figure 7B:
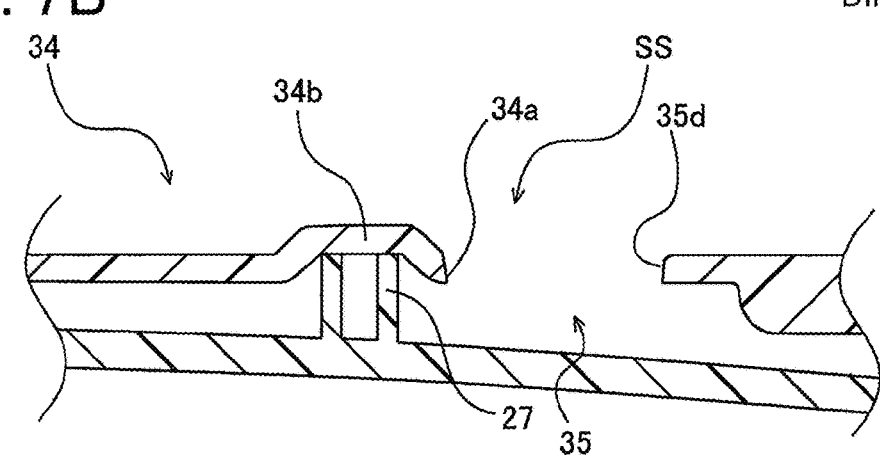
FIG. 7B is a partial enlarged sectional view corresponding to FIG. 7A.

FIGS. 7A and 7B show the knob 30 according to the present embodiment being joined to the slider 20. FIG. 7A is a plan view thereof and FIG. 7B is a partial enlarged sectional view thereof. As shown in FIGS. 7A and 7B, in joining the knob 30 to the slider 20, first, the knob 30 is placed so that the convexes 34*b* of the flexible members 34 are positioned on the bosses 27. In this state, the knob 30 does not enter the gaps S2, S3 of the plurality of engaging catches 25, 26 (see FIGS. 4A and 4B).

Figure 8:
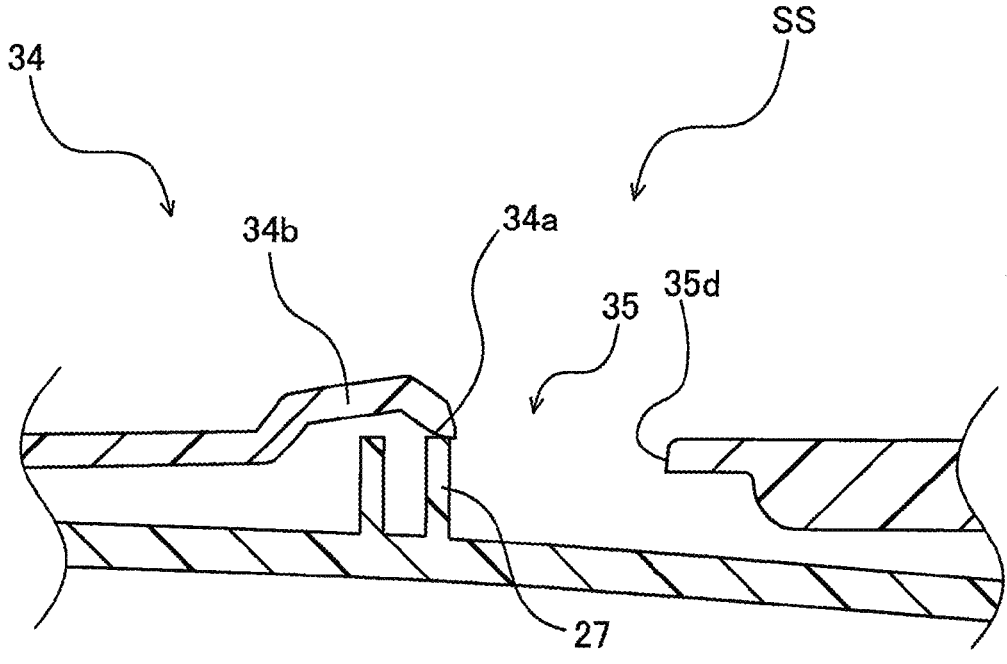
FIG. 8 is a partial enlarged sectional view showing the relationship between a flexible member and a boss in the process of joining the knob to the slider.

FIG. 8 is a partial enlarged sectional view showing the relationship between the flexible member 34 and the boss 27 in the process of joining the knob 30 to the slider 20. As shown in FIGS. 7A and 7B, after placing the knob 30 to position the convexes 34*b* of the flexible members 34 on the bosses 27, the operator slides the knob 30 entirely downward (i.e., the second direction opposite to the extending direction of the flexible member 34) by a predetermined distance. This allows the knob 30 to enter the gaps S2, S3 of the plurality of engaging catches 25, 26 to be joined. Here, as shown in FIG. 8, the flexible members 34 have their tips 34*a* climbed over the bosses 27, achieving the state in FIG. 5B through the state in FIG. 8. When the state in FIG. 5B is entered, as described above, the restriction structure RS functions. That is, as shown in FIG. 5B, when the tip 34*a* of each flexible member 34 climbs over the boss 27, the flexible member 34 leaves the position on the boss 27 and the boss 27 is positioned between the flexible member 34 and the other end 35*d* of the slit 35. As a result, as described above, the knob 30 is restricted from excessively shifting when operated to slide.

Next, a description will be given of the operation of the center pillar's upper part trim 1 according to the present embodiment. As described above, by virtue of the center pillar's upper part trim 1 having the slide-and-join structure SS, the knob 30 is joined by sliding without being joined to the engaging catches 25, 26 in the plane direction. This configuration eliminates the necessity of joining the knob 30 to the slider 20 while flexing the engaging catches 25, 26. Hence, the configuration requires less force in joining the knob 30 and suppresses blanching of the slider 20 due to flexing of the engaging catches 25, 26.

In particular, each flexible member 34 has the convex 34*b*. When placed on corresponding boss 27, the convex 34*b* is convex in the direction avoiding contact with the boss 27. Thus, positioning the convexes 34*b* on the bosses 27 before joining the knob 30 will exert the positioning effect. Furthermore, since each convex 34*b* is convex in the direction avoiding contact with corresponding boss 27, the operator should just move the knob 30 downward from the state in FIGS. 7A and 7B. That is, if the flexible members 34 did not have the convexes 34*b* and linear, the whole knob 30 would be significantly lifted up by the bosses 27 when the flexible members 34 were placed on the bosses 27. This would force the operator to press the knob 30 against the slider 20 to slide and join them to each other. In contrast, the flexible members 34 with the convexes 34*b* prevent the knob 30 from being lifted up and hence require less pressing force.

The center pillar's upper part trim 1 having the restriction structure RS attains the following effect. When the user operates the knob 30 after joining the knob 30 to the slider 20, as shown in FIGS. 5A and 5B, the tip 34*a* of each flexible member 34 and corresponding boss 27 are brought into contact with each other to restrict the knob 30 from excessively shifting upwardly (i.e., excessively shifting in the first direction). In particular, even when the user forcibly presses in the knob 30 to bring the flexible members 34 and the bosses 27 into contact with each other, the flexible members 34 exhibit the buffering function, thereby reducing the risk of damaging the bosses 27. When the knob 30 is in an unoperated mode, as shown in FIGS. 3A and 3B, the other end 35d of each slit 35 and corresponding boss 27 are brought into contact with each other to restrict the knob 30 from excessively shifting downwardly (i.e., excessively shifting in the second direction).

Additionally, a plurality of combination sets of bosses 27, flexible members 34, and slits 35 are provided. The knob 30 is restricted from shifting in the short-side direction by the cooperation of the narrow part 35b of each slit 35 and corresponding boss 27. This configuration properly facilitates the user's sliding operations in the vertical direction.

The first engaging catches 25 externally slidably hold the knob 30. The second engaging catches 26 internally slidably hold the knob 30, inside the opening 32 of the knob 30. This configuration similarly suppresses displacement of the knob 30 in the short-side direction, contributing to proper vertical sliding operations.

In this manner, since the center pillar's upper part trim 1 according to the present embodiment includes the slide-and-join structure SS, the user doesn't have to push in the knob 30 in the plane direction to join the knob 30 to the engaging catches 25, 26. The slide-and-join structure SS requires less force in joining and suppresses blanching. By virtue of provision of the restriction structure RS, when the knob 30 is joined to the slider 20, each boss 27 is positioned between corresponding flexible member 34 and the other end 35d of corresponding slit 35 to restrict excessive shifting. This configuration eliminates the necessity of forming a restriction member above or under the knob 30. Thus, the present embodiment provides the center pillar's upper part trim 1 that can dispense with a restriction member on the slider 20 in the operation direction relative to the knob 30, requires less force in joining the knob 30, and suppresses blanching.

Each flexible member 34 has the convex 34b that is convex in the direction avoiding contact with corresponding boss 27. Aligning the boss 27 with corresponding convex 34b simplifies the state before a sliding operation. In sliding the knob 30 from the state where the flexible members 34 are placed on the bosses 27 to join the knob 30 to the plurality of engaging catches 25, 26, the user would have to push in the knob 30 while sliding if there were no convexes 34b. Less push-in force will suffice by provision of the convexes 34b. Thus, the user can perform a slide-and-join operation simply and easily.

There is provided a plurality of combination sets of bosses 27, flexible member 34, and other ends 35d of slits 35. The narrow part 35b is provided between each flexible member 34 and the other end 35d of corresponding slit 35. This configuration restricts the knob 30 from shifting in the direction crossing the sliding operation direction and facilitates the user operating the knob 30 to move the knob 30 properly in the sliding operation direction. Thus, operability improves.

In the foregoing, the present invention has been described based on the embodiment. The present invention is not limited to the embodiment and may be changed or combined with publicly known or well-known techniques when possible within the scope not departing from the gist of the present invention.

For example, while each flexible member 34 has the convex 34b in the embodiment, the present invention is not limited thereto, and may be formed linearly without any convex 34b. Alternatively, each flexible member 34 may have a gap instead of the convex 34b to realize a similar operation.

While the present embodiment includes a plurality of combination sets of flexible members 34 and slits 35, the present invention is not limited thereto and may include just one set. While a particular description has not been given, in the present embodiment, as shown in FIG. 2, the slider 20 has ribs R extending in the operation direction (vertical direction). Providing the knob 30 with grooves on its front side fitting the ribs R will prevent the knob 30 from displacing in the short-side direction. Accordingly, just one set of flexible member 34 and slit 35 may suffice.

While each boss 27 is positioned at the narrow part 35b of corresponding slit 35 in the present embodiment, the present invention is not limited thereto and each slit 35 may not have the wide part 35a and the narrow part 35b and instead have a constant width.

While any excessive vertical shifting of the knob 30 is restricted by the restriction structure RS in which each boss 27 is held between the tip 34a of corresponding flexible member 34 and the other end 35d of corresponding slit 35 in the present embodiment, the restriction is not limited to that exerted by the other end 35d of the slit 35, and merely the wall outside the slit may restrict such excessive shifting. Without being limited to the tip 34a of each flexible member 34, the side of each flexible member 34 shaped to be bent midways or the like may restrict such excessive shifting.

REFERENCE SIGNS LIST

1: center pillar's upper part trim
10: base member
11: opening
20: slider
25: first engaging catch
26: second engaging catch
27: boss
30: knob
34: flexible member
34b: convex
35: slit
35b: narrow part (sidewall)
35d: other end (opposed wall)
RS: restriction structure
S2: gap (space)
S3: gap (space)
SS: slide-and-join structure

The invention claimed is:

1. A center pillar's upper part trim covering a vehicular center pillar, comprising:
   a base member mounted on the vehicular center pillar and having an opening;
   a slider mounted on the opening from a back side of the base member to be slidable; and
   a knob joined from a back side of the slider by a plurality of engaging catches to be slidably operated, the knob being partially exposed on a front side as an operation part,
   wherein the slider has a boss projecting in a back side direction,
   the knob has a flexible member extending in a cantilever manner in a first direction being one operation direction of the knob and an opposed wall opposed to the flexible member on the first direction side of the flexible member, the center pillar's upper part trim further comprising a slide-and-join structure allowing, in joining the knob to the slider, the knob to fit in a space between the back side of the slider and the plurality of engaging catches by causing the knob having the flexible member placed on the boss to slide by a predetermined distance in a second direction opposite to the first direction, and a restriction structure restricting the knob, when the knob has joined to the slider fitting in the space as a result of the sliding by a predetermined distance, from excessively shifting in the first direction and the second direction by the flexible member leaving the position on the boss to set the boss between the flexible member and the opposed wall, and by the boss being brought into contact with the flexible member or the opposed wall when the knob is operated.

2. The center pillar's upper part trim according to claim 1, wherein the flexible member being convex in a direction facing away from the boss.

3. The center pillar's upper part trim according to claim 1, wherein the slider has a plurality of the bosses, and the knob has a plurality of combination sets of the flexible member and the opposed wall, and a sidewall between the flexible member and the opposed wall in each set, the sidewall restricting the knob from shifting in a direction crossing a sliding operation direction of the knob.

4. The center pillar's upper part trim according to claim 2, wherein the slider has a plurality of the bosses, and the knob has a plurality of combination sets of the flexible member and the opposed wall, and a sidewall between the flexible member and the opposed wall in each set, the sidewall restricting the knob from shifting in a direction crossing a sliding operation direction of the knob.

* * * * *